(12) United States Patent
Tamura et al.

(10) Patent No.: US 10,955,895 B2
(45) Date of Patent: Mar. 23, 2021

(54) INFORMATION PROCESSING APPARATUS, POWER RECEPTION AND DELIVERY CONTROL CIRCUIT, AND CONTROL METHOD FOR POWER RECEPTION AND DELIVERY

(71) Applicant: FUJITSU CLIENT COMPUTING LIMITED, Kanagawa (JP)

(72) Inventors: Yuki Tamura, Kawasaki (JP); Hirotaka Yakame, Kawasaki (JP); Tatsuya Shimura, Kawasaki (JP); Tomonori Fujii, Kawasaki (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 153 days.

(21) Appl. No.: 16/441,850

(22) Filed: Jun. 14, 2019

(65) Prior Publication Data
US 2019/0294228 A1    Sep. 26, 2019

Related U.S. Application Data

(63) Continuation of application No. PCT/JP2017/044170, filed on Dec. 8, 2017.

(30) Foreign Application Priority Data

Jan. 13, 2017 (JP) .............................. JP2017-004485

(51) Int. Cl.
*G06F 1/3212* (2019.01)
*H02J 7/00* (2006.01)
*G06F 1/26* (2006.01)

(52) U.S. Cl.
CPC .............. *G06F 1/3212* (2013.01); *G06F 1/26* (2013.01); *H02J 7/00* (2013.01); *H02J 7/0047* (2013.01); *H02J 7/0048* (2020.01)

(58) Field of Classification Search
CPC .......... G06F 1/26; G06F 1/266; G06F 1/3212; G06F 1/3287; H02J 7/00; H02J 7/0047; H02J 7/0048; Y02D 10/00
See application file for complete search history.

(56) References Cited

U.S. PATENT DOCUMENTS 7,447,922 B1 * 11/2008 Asbury .................. G06F 1/266
710/303
2006/0035527 A1 * 2/2006 Numano ................ G06F 1/266
439/668

(Continued)

FOREIGN PATENT DOCUMENTS

JP      2003-44177 A     2/2003
JP      2006-053748 A    2/2006

(Continued)

OTHER PUBLICATIONS

USB-IF, USB Type-C Cable and Connector Specification Release 1.1, Apr. 3, 2015, in particular, pp. 108-119 (12 pages).

(Continued)

*Primary Examiner* — Terrell S Johnson
(74) *Attorney, Agent, or Firm* — Osha Bergman Watanabe & Burton LLP

(57) ABSTRACT

An information processing apparatus includes: a first control device that controls, in accordance with an operation mode, power reception/delivery from/to an external device connected to the information processing apparatus; a battery that is recharged by an external power supply or the external device; a second control device that acquires a power supply state of the information processing apparatus; and a third control device that determines whether power is being delivered from the external power supply to the information processing apparatus; and sets the operation mode of the first control device to a first mode based on the power supply state and on a result of the determination. The first mode is (Continued)

an operation mode in which the power reception alone is enabled between the power reception from the external device and the power delivery to the external device.

11 Claims, 14 Drawing Sheets

(56) References Cited

U.S. PATENT DOCUMENTS

| | | |
|---|---|---|
| 2010/0115150 A1 | 5/2010 | Hachiya |
| 2016/0099597 A1 | 4/2016 | Nakayama et al. |
| 2019/0129872 A1* | 5/2019 | Xu .................... G06F 13/4068 |

FOREIGN PATENT DOCUMENTS

| | | |
|---|---|---|
| JP | 2006-85248 A | 3/2006 |
| JP | 2010-108423 A | 5/2010 |
| JP | 2011-60299 A | 3/2011 |
| JP | 2015-82917 A | 4/2015 |
| JP | 2016-12231 A | 1/2016 |
| JP | 2016-77065 A | 5/2016 |

OTHER PUBLICATIONS

International Search Report issued in corresponding International Application No. PCT/JP2017/044170 dated Feb. 20, 2018, with translation (5 pages).

* cited by examiner

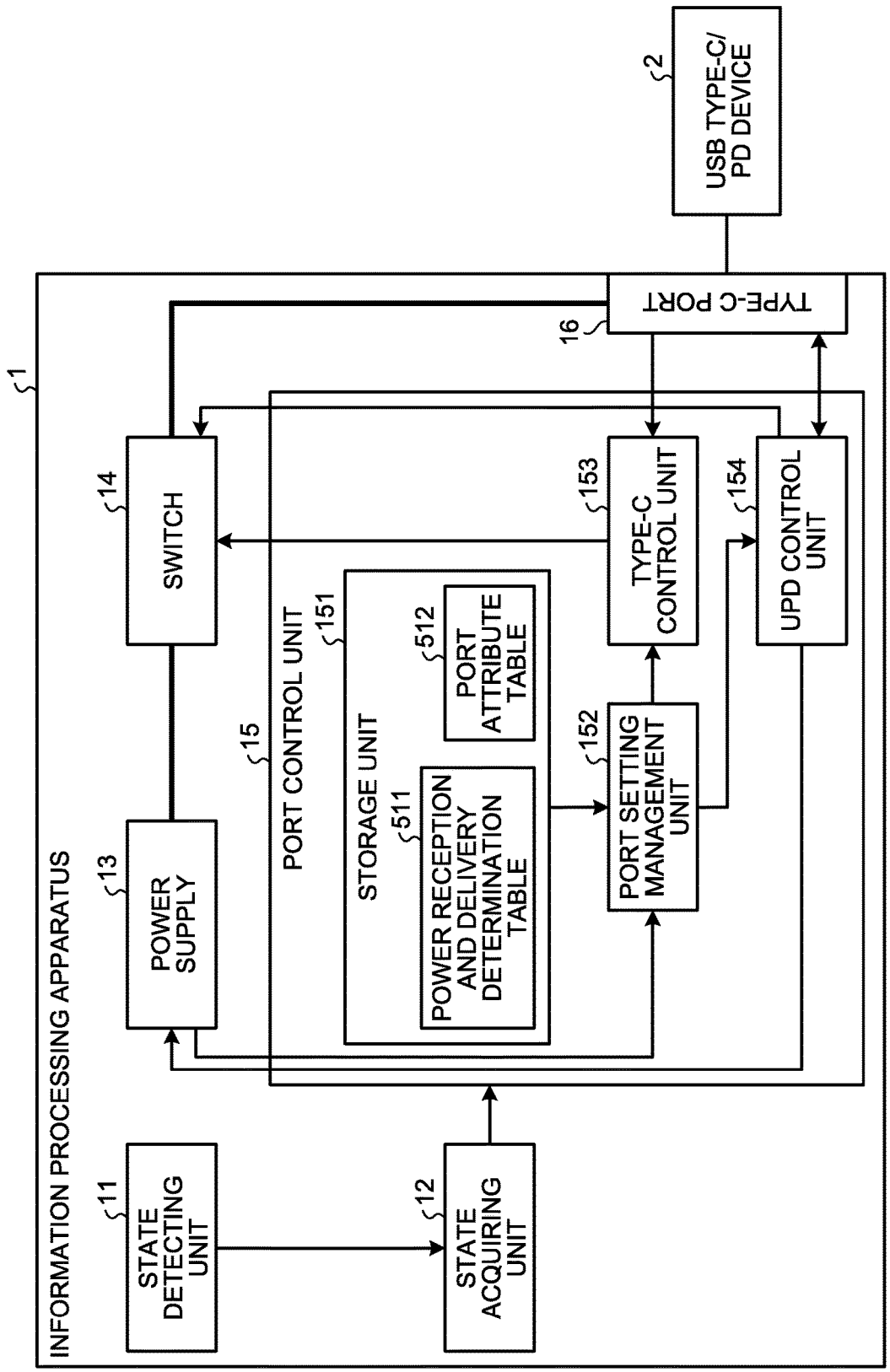

FIG.2

| | SPECIFIC OPERATION |
|---|---|
| POWER DELIVERY MODE | DOWNSTREAM FACING PORT (DFP); DELIVER POWER TO UDP TYPE-C/PD DEVICE |
| POWER RECEPTION MODE | UPSTREAM FACING PORT (UFP); RECEIVE POWER FROM UDP TYPE-C/PDT DEVICE |
| SELECTION MODE | DUAL-ROLE PORT; SELECT EITHER DFP OR UFP |

FIG.3

| | S0/S3 | S4/S5/G3 |
|---|---|---|
| AC ADAPTER IS INSERTED | SELECTION MODE | SELECTION MODE |
| AC ADAPTER IS NOT INSERTED | SELECTION MODE | POWER RECEPTION MODE |

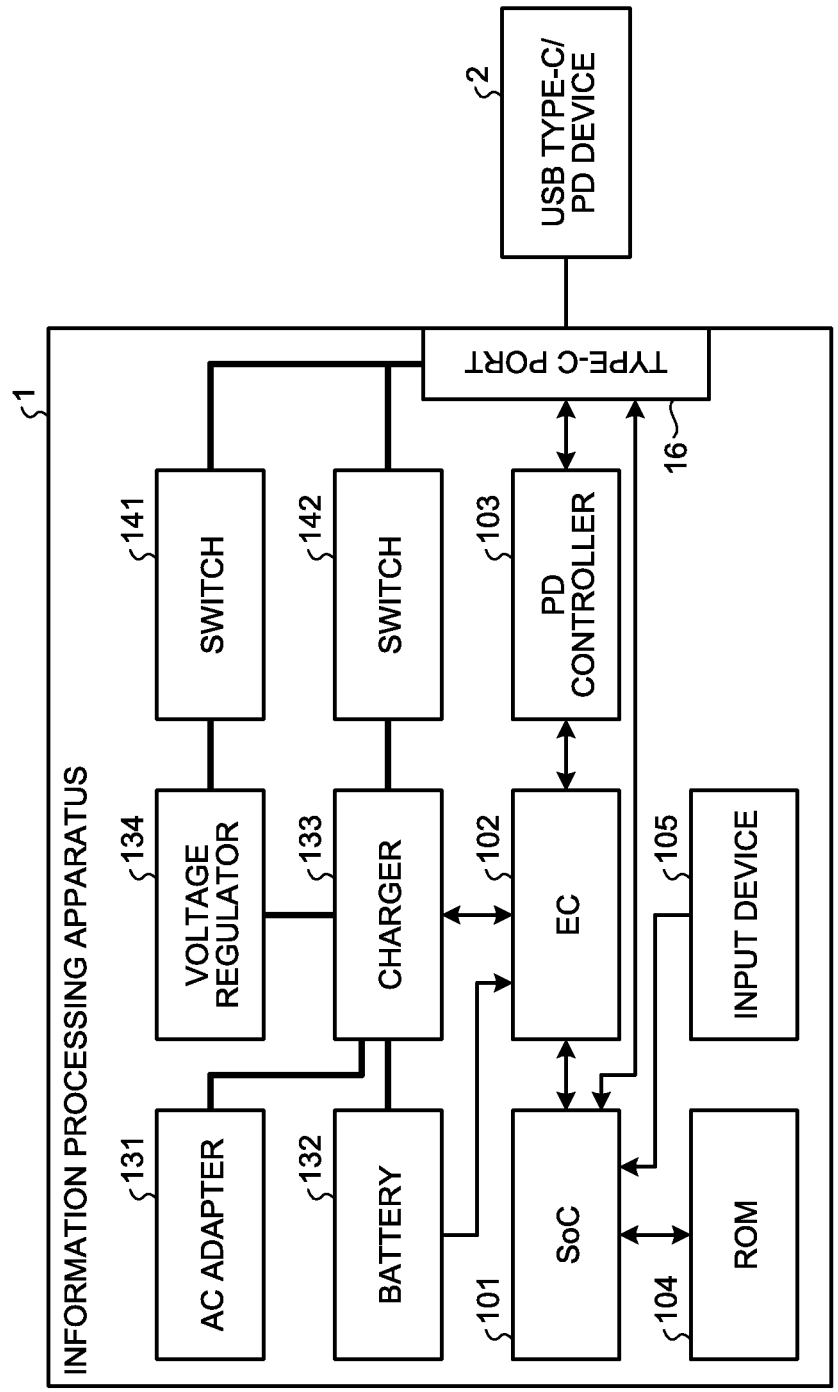

FIG.13

| POWER SUPPLY STATE | POWER RECEPTION MODE | POWER RECEPTION MODE BIT | OPERATION |
|---|---|---|---|
| S0/S3 | N/A | NOT SET UP YET | UNCHANGED (RETAIN NORMAL MODE) |
| | | ALREADY SET UP | CANCEL POWER RECEPTION MODE |
| S4/S5/G3 | DISABLED | NOT SET UP YET | UNCHANGED (RETAIN NORMAL MODE) |
| | | ALREADY SET UP | CANCEL POWER RECEPTION MODE |
| | ENABLED | NOT SET UP YET | SWITCH TO POWER RECEPTION MODE |
| | | ALREADY SET UP | UNCHANGED (RETAIN POWER RECEPTION MODE) |

FIG.14

| POWER SUPPLY STATE | POWER RECEPTION MODE | POWER RECEPTION MODE BIT | OPERATION |
|---|---|---|---|
| TRANSITION FROM S0 TO S3 | N/A | N/A | UNCHANGED (RETAIN NORMAL MODE) |
| TRANSITION FROM S3 TO S0 | N/A | N/A | UNCHANGED (RETAIN NORMAL MODE) |
| TRANSITION FROM S0 TO S4, S5, OR G3 | DISABLED | NOT SET UP YET | UNCHANGED (RETAIN NORMAL MODE) |
| | DISABLED | ALREADY SET UP | CHECK FOR POWER DELIVERY |
| | ENABLED | NOT SET UP YET | CHECK FOR POWER DELIVERY |
| | ENABLED | ALREADY SET UP | UNCHANGED (RETAIN POWER RECEPTION MODE) |
| TRANSITION FROM S4, S5, OR G3 TO S0 | DISABLED | NOT SET UP YET | UNCHANGED (RETAIN NORMAL MODE) |
| | DISABLED | ALREADY SET UP | CHECK FOR POWER DELIVERY |
| | ENABLED | NOT SET UP YET | CHECK FOR POWER DELIVERY |
| | ENABLED | ALREADY SET UP | UNCHANGED (RETAIN POWER RECEPTION MODE) |

INFORMATION PROCESSING APPARATUS, POWER RECEPTION AND DELIVERY CONTROL CIRCUIT, AND CONTROL METHOD FOR POWER RECEPTION AND DELIVERY

CROSS-REFERENCE TO RELATED APPLICATIONS

This application is a continuation of PCT International Application No. PCT/JP2017/044170 filed on Dec. 8, 2017 which claims priority from Japanese Patent Application No. 2017-004485 filed on Jan. 13, 2017, the entire contents of which are incorporated herein by reference.

FIELD

The present disclosure relates to an information processing apparatus, a power reception and delivery control circuit, and a control method for power reception and delivery.

BACKGROUND

In recent years, ports that follow the universal serial bus (USB) Type-C standard, which is capable of receiving and delivering large current, have been increasingly incorporated into information processing apparatuses, such as personal computers (PCs) and mobile terminals. The following description refers to a port that follows the USB Type-C standard simply as a "Type-C port". The Type-C port generally has a power reception and delivery control function that follows the standard called the USB Power Delivery (UPD). The UPD is a standard for delivering power up to 100 W via a USB cable. The Type-C port is known as an interface with a low-profile universal connector, which is capable of receiving and delivering power in addition to transmitting and receiving USB/DisplayPort signals, and is sufficient to implement a connector for connecting an information processing apparatus and a functional expansion device to each other.

A system including the Type-C port, which follows the UPD standard, is provided with an application specific integrated circuit (ASIC) that is called a power delivery controller (hereinafter referred to as "PD controller"). A PD controller controls connection detection, power supply delivery, and power supply demand. The system further includes a microcomputer incorporated therein that is called an embedded controller (EC), which controls the PD controller and a power supply. Between an EC installed in a functional expansion device and the EC installed in the information processing apparatus, signals are transmitted and received by using vendor defined message (VDM) communication via respective PD controllers of the functional expansion device and the information processing apparatus.

The system including the Type-C port of the USB Type-C standard is capable of switching on and off (activating and deactivating) the UPD function of the EC. When the UPD function is activated, power is received and delivered between the information processing apparatus and an expansion device regardless of whether the information processing apparatus is in a working state or in a non-working state. Herein, the non-working state indicates a power-saving state, such as a hibernation state or a suspend state, or a shutdown state. When the UPD function is deactivated and the information processing apparatus is in a non-working state, power reception and delivery between the information processing apparatus and the expansion device are stopped.

There is a conventional technique for such power delivery using the USB, in which power delivery to an expansion device connected to an information processing apparatus is continued even if power supply to the information processing apparatus is switched off.

However, when the UPD function is activated, power is delivered from a battery of the information processing apparatus, which is in a non-working state, to an expansion device, which does not need power delivery thereto, and thereby power in the battery may be exhausted. On the other hand, when the UPD function is deactivated, power cannot be delivered from the information processing apparatus in the non-working state to the expansion device requesting power delivery, and also the information processing apparatus cannot receive power.

SUMMARY

One aspect of an information processing apparatus according to the present disclosure includes: a first control device configured to control, in accordance with an operation mode, power reception from an external device and power delivery to the external device, the external device being connected to the information processing apparatus; a battery configured to be recharged by an external power supply or the external device; a second control device configured to acquire a power supply state of the information processing apparatus; and a third control device configured to determine whether power is being delivered from the external power supply to the information processing apparatus, and set the operation mode of the first control device to a first mode based on the power supply state acquired by the second control device and on a result of the determination, the first mode being an operation mode in which the power reception alone is enabled between the power reception from the external device and the power delivery to the external device.

The present disclosure is capable of efficiently carrying out power reception and delivery.

BRIEF DESCRIPTION OF THE DRAWINGS

FIG. 1 is a block diagram of an information processing apparatus according to a first embodiment;

FIG. 2 is a diagram of an example of a port attribute table;

FIG. 3 is a diagram of an example of a power reception and delivery determination table;

FIG. 4 is a hardware configuration diagram of the information processing apparatus;

FIG. 13 is a diagram of an example of an operation table used when a device is disconnected;

FIG. 14 is a diagram of an example of an operation table used when transition of a power supply state occurs.

DETAILED DESCRIPTION

Figure 5:
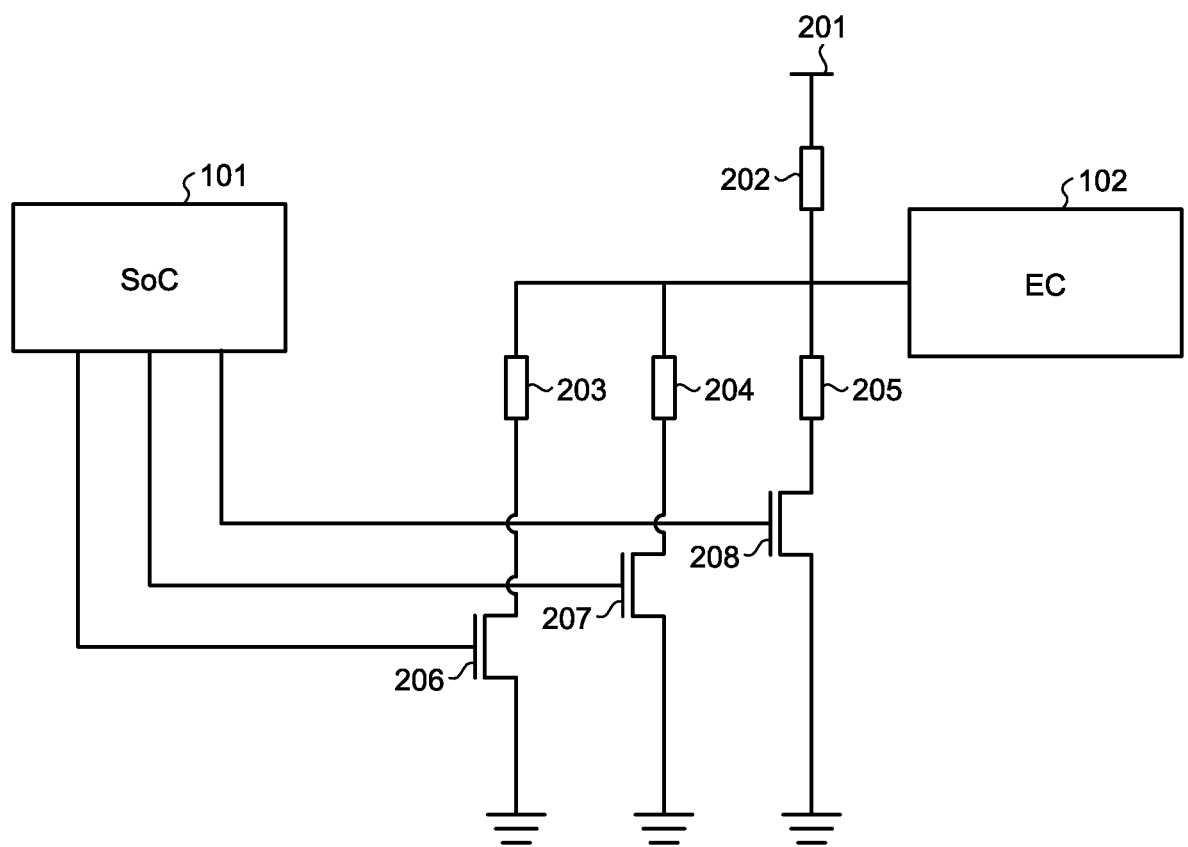
FIG. 5 is a circuit diagram for explaining an example of a method for power supply state notification.

Embodiments of an information processing apparatus, a power reception and delivery control circuit, and a control method for power reception and delivery that are disclosed in this application are described in detail below based on the drawings. The following embodiments are not intended to limit the information processing apparatus, the power reception and delivery control circuit, and the control method for power reception and delivery that are disclosed in the present application.

First Embodiment

FIG. 1 is a block diagram of an information processing apparatus according to a first embodiment. The information processing apparatus 1 includes a state detecting unit 11, a state acquiring unit 12, a power supply 13, a switch 14, a port control unit 15, and a Type-C port 16, as illustrated in FIG. 1.

The Type-C port 16 follows the USB Type-C standard and also follows the UPD standard. A USB Type-C/PD device 2 is to be connected to the Type-C port 16. The USB Type-C/PD device 2 is an expansion device that follows the USB Type-C standard and also follows the UPD standard. This USB Type-C/PD device 2 corresponds to an example of the "external device".

The power supply 13 delivers power to each component of the information processing apparatus 1. The switch 14 switches power delivery paths that connect the power supply 13 and the Type-C port 16 to each other, the power delivery paths going toward the power supply 13 and going toward the Type-C port 16.

The state detecting unit 11 acquires information on apparatus states of the information processing apparatus 1. Examples of the apparatus states of the information processing apparatus 1 include: indication of whether an alternating current (AC) adapter 131 is connected to the information processing apparatus 1; a power supply state representing a power supply system that delivers power in the information processing apparatus 1; and a remaining battery level. The state detecting unit 11 outputs the acquired information on the apparatus states to the state acquiring unit 12.

The power supply state may indicate one of states S0 to S5 and G3. The state S0 is a state where the information processing apparatus 1 is operating, that is, a state where all power supply is activated for operation of the information processing apparatus 1. The information processing apparatus, which is in any state other than S0, shifts the state to S0 when driving a component such as central processing unit (CPU) on a system-on-a-chip (SoC) 101.

The state S3 is a sleep state. In the sleep state, information of the information processing apparatus 1 are stored in a main storage (not illustrated), and power supply is delivered to the main storage.

The state S4 is a suspend state. In the suspend state, information of the information processing apparatus 1 is stored in an auxiliary storage device (not illustrated), and power supply is delivered to an auxiliary storage device.

The state S5 includes a shutdown state and a state where power supply is stopped toward almost all devices except some devices that may become factors of reactivating the system (such as devices for a local area network (LAN)) and other devices that need power supply at all times (such as an EC 102 and a PD controller 103).

The state G3 includes a shutdown state and a state where power supply is stopped toward almost all devices except devices that need power supply at all times (such as the EC 102 and the PD controller 103).

In summary, when the power supply state is S4, S5, or G3, the information processing apparatus 1 is in a power-saving state. When the power supply state is S3, although power consumption is saved, the information processing apparatus 1 is in a state where the information processing apparatus 1 may be requested by the USB Type-C/PD device 2 to supply power. When the power supply state is S0, the information processing apparatus 1 is in a normal power consumption state.

The state acquiring unit 12 receives input of the information on the apparatus states of the information processing apparatus 1 from the state detecting unit 11. The state acquiring unit 12 outputs the acquired information on the apparatus states to the port control unit 15.

Herein, although the state acquiring unit 12 is configured in the present embodiment to output the apparatus information exactly as acquired, apparatus information may be output after performing some process thereon. For example, the state acquiring unit 12 may notify information indicating the possibility of battery recharge when the acquired remaining battery level is less than a threshold previously determined.

The port control unit 15 includes a storage unit 151, a port setting management unit 152, a Type-C control unit 153, and a UPD control unit 154.

The storage unit 151 stores a power reception and delivery determination table 511 and a port attribute table 512. The port attribute table 512 represents directions of power deliver in the USB Type-C port 16. The port attribute table 512 is, for example, a table illustrated in FIG. 2. FIG. 2 is a diagram of an example of a port attribute table.

The USB Type-C port 16 has, as operation modes thereof, a power delivery mode, a power reception mode, and a selection mode as illustrated in FIG. 2. The power delivery mode is a mode that uses a downstream facing port (DFP), through which power is delivered from the information processing apparatus 1 to the USB Type-C/PD device 2. The power reception mode is a mode that uses an upstream facing port (UFP), through which power is delivered from the USB Type-C/PD device 2 to the information processing apparatus 1. The selection mode is a mode that uses a dual roll port, through which the direction of power sharing is determined depending on configuration of the USB Type-C/PD device 2 connected to the information processing apparatus 1. The port attribute table 512 includes setting information for the respective operation modes, although it is not illustrated in detail in FIG. 2. A determination as to which of those operation modes is applied is made when settings for a Type-C control unit 153 and a UPD control unit 154 are changed, as described later.

The power reception and delivery determination table 511 is used for determining whether to shift to the power reception mode, in which the information processing apparatus 1 receives power delivery from the USB Type-C/PD device 2. The power reception and delivery determination table 511 may be a table illustrated in FIG. 3. FIG. 3 is a diagram of an example of the power reception and delivery determination table.

For example, as illustrated in FIG. 3, the power reception and delivery determination table 511 is a table used for selecting one of the operation modes for the Type-C port 16 depending on the power supply state of the information processing apparatus 1 and the insertion state of the AC adapter 131. When the power supply state is S0 or S3, the selection mode is selected as the operation mode for the Type-C port 16. When the power supply state is S4, S5, or G3 without insertion of the AC adapter 131, the power reception mode is selected as the operation mode for the Type-C port 16. When the power supply state is S4, S5, or G3 with insertion of the AC adapter 131, the selection mode is selected as the operation mode for the Type-C port 16.

The port setting management unit 152 acquires information on the power supply state that has been input from the state acquiring unit 12. The port setting management unit 152 receives, from the power supply 13, input of information on the insertion state of the AC adapter 131.

Thereafter, upon detecting a change in the insertion state of the AC adapter 131 or a change in the power supply state of the information processing apparatus 1, the port setting management unit 152 cancels the power reception mode when the Type-C control unit 153 and the UPD control unit 154 are in the power reception mode. The port setting management unit 152 then initializes the Type-C control unit 153 and the UPD control unit 154.

Thereafter, when the power supply state is S0 or S3, or when the power supply state is S4, S5, or G3 with insertion of the AC adapter 131, the port setting management unit 152 takes the selection mode as the operation mode. The port setting management unit 152 acquires information on settings of the Type-C control unit 153 and the UPD control unit 154 for the selection mode from the port attribute table 512. The port setting management unit 152 then sets the Type-C control unit 153 and the UPD control unit 154 into the selection mode.

In contrast, when the power supply state is S4, S5, or G3 without insertion of the AC adapter 131, the port setting management unit 152 instructs the UPD control unit 154 to disable reception of a notification that the direction of power delivery be changed. Here, reception of a notification that the direction of power delivery be changed is referred to also as Power Role Swap Accept Disable. The port setting management unit 152 acquires, from the power reception and delivery determination table 511, the power reception mode as the operation mode to be set when the power state is S4, S5, or G3 without insertion of the AC adapter 131. The port setting management unit 152 acquires, from the port attribute table 512, information on settings of the Type-C control unit 153 and the UPD control unit 154 for the power reception mode. The port setting management unit 152 then sets the Type-C control unit 153 and the UPD control unit 154 into the power reception mode. The port setting management unit 152 corresponds to an example of part of a "control device".

The Type-C control unit 153 controls transmission and reception of USB Type-C signals. The Type-C control unit 153 performs, for example, detection of the USB Type-C/PD device 2 in response to a signal output from the USB Type-C/PD device 2.

The Type-C control unit 153 is set in a certain operation mode that is designated by being controlled to set the operation mode by the port setting management unit 152. When the operation mode is set to the selection mode, the Type-C control unit 153 switches the switch 14 between directions of power delivery depending on the USB Type-C/PD device 2 that has been connected. For example, when the connected USB Type-C/PD device 2 is a device that delivers power, the Type-C control unit 153 switches the switch 14 so that power can be delivered from the USB Type-C/PD device 2 toward the power supply 13. On the other hand, when the connected USB Type-C/PD device 2 is a device that consumes power, the Type-C control unit 153 switches the switch 14 so that power can be delivered from the power supply 13 toward the USB Type-C/PD device 2.

When the operation mode is set to the power reception mode, the Type-C control unit 153 switches the switch 14 so that power can be delivered from the USB Type-C/PD device 2 toward the power supply 13 and then retains the state of the switch 14.

Furthermore, when the operation mode is set to the power delivery mode, the Type-C control unit 153 switches the switch 14 so that power can be delivered from the power supply 13 toward the USB Type-C/PD device 2 and retains the state of the switch 14.

The UPD control unit 154 controls power delivery. The UPD control unit 154 transmits and receives messages to and from the USB Type-C/PD device 2 regarding power delivery and configures power delivery. For example, the UPD control unit 154 determines a voltage value at which power is received from or delivered to the USB Type-C/PD device 2, and determines the direction of power delivery. The UPD control unit 154 then controls the power supply 13 so that the power reception or delivery can be performed at the determined voltage value and the determined direction of power delivery.

The UPD control unit 154 is set in a certain operation mode that is designated by being controlled to set the operation mode by the port setting management unit 152. When the operation mode is set to the selection mode, the UPD control unit 154 switches the switch 14 between directions of power delivery in accordance with the connected USB Type-C/PD device 2. For example, when the connected USB Type-C/PD device 2 is a device that delivers power, the UPD control unit 154 switches the switch 14 so that power can be delivered from the USB Type-C/PD device 2 toward the power supply 13. When the connected USB Type-C/PD device 2 is a device that consumes power, the UPD control unit 154 switches the switch 14 so that power can be delivered from the power supply 13 toward the USB Type-C/PD device 2.

When the operation mode is set to the power reception mode, the UPD control unit 154 switches the switch 14 so that power can be delivered from the USB Type-C/PD device 2 toward the power supply 13 and then retains the state of the switch 14.

Furthermore, when the operation mode is set to the power delivery mode, the UPD control unit 154 switches the switch 14 so that power can be delivered from the power supply 13 toward the USB Type-C/PD device 2 and then retains the state of the switch 14.

Additionally, the UPD control unit 154 controls power delivery from the power supply 13 in accordance with the operation mode that has been set.

Here, while both of the Type-C control unit 153 and the UPD control unit 154 are described as being configured to switch the switch 14 in the present embodiment, either the Type-C control unit 153 or the UPD control unit 154 may be configured to switch the switch 14.

FIG. 4 is a hardware configuration diagram of the information processing apparatus. As illustrated in FIG. 4, the information processing apparatus 1 includes, as hardware components, the SoC 101, the EC 102, the PD controller 103, a read only memory (ROM) 104, and an input device 105. The information processing apparatus 1 further includes the AC adapter 131, a battery 132, a charger 133, and a voltage regulator 134. The information processing apparatus 1 further includes switches 141 and 142 and the Type-C port 16. Here, a further description is given of power reception and delivery control that the information processing apparatus 1 performs is described here using the hardware components illustrated in FIG. 4.

The AC adapter 131, the battery 132, the charger 133, and the voltage regulator 134 implement, for example, functions of the power supply 13 illustrated in FIG. 1.

Specifically, the AC adapter 131 receives power delivery from, for example, a commercial power supply and outputs the delivered power to the charger 133. The AC adapter 131 corresponds to an example of an "external power supply". The battery 132 is a power storage member embedded in the information processing apparatus 1. The battery 132 outputs power stored therein to the charger 133 when no power is output from the AC adapter 131.

Depending on power delivery from the AC adapter 131, the charger 133 determines whether the AC adapter 131 has been inserted. The charger 133 then notifies the EC 102 of an AC adapter detection signal, which indicates whether or not the AC adapter 131 has been inserted.

When delivering power from the information processing apparatus 1, the charger 133 receives power delivery from the AC adapter 131 or the battery 132. The charger 133 then delivers, to the individual components, corresponding types of power supply that it has generated using power delivered thereto. For example, the charger 133 delivers the types of power supply to the SoC 101, the EC 102, and the PD controller 103. When power is to be delivered to the USB Type-C/PD device 2, the charger 133 outputs the corresponding generated type of power supply to the USB Type-C/PD device 2 via the switch 141 and the Type-C port 16.

On the other hand, when the information processing apparatus 1 receives power delivery, the charger 133 receives power delivery from the USB Type-C/PD device 2 via the Type-C port 16 and the switch 142. The charger 133 then outputs, to the individual components, the type of power supply that it has generated using the delivered power. Additionally, the charger 133 recharges the battery 132.

The voltage regulator 134 receives power delivery from the charger 133. The voltage regulator 134 then boosts the voltage of power delivered thereto and then outputs the power to the switch 141.

The switches 141 and 142 implement the function of the switch 14. The switch 141 connects or disconnects a power delivery path that is directed from the power supply 13 toward the Type-C port 16. The switch 142 connects or disconnects a power delivery path that is directed from the Type-C port 16 toward the power supply 13.

The SoC 101 implements the function of the state detecting unit 11 illustrated in FIG. 1. The SoC 101 includes components such as a CPU. The SoC 101 writes data into the ROM 104 by use of an Inter-Integrated Circuit (I2C). For example, the SoC 101 starts up a basic input output system (BIOS) stored in the ROM 104. The SoC 101 changes settings of the BIOS in response to input from the input device 105. The SoC 101 loads an operating system (OS) from a hard disk (not illustrated) and starts up the OS.

Additionally, the SoC 101 transmits and receives signals by using the EC 102 and the I2C. The SoC 101 acquires the power supply state of the information processing apparatus 1 and outputs a state notification signal indicating the acquired power supply state to the EC 102.

Furthermore, the SoC 101 is connected to the USB Type-C/PD device 2 through a signal line via the Type-C port 16. Using this signal line, the SoC 101 transmits and receives, for example, USB signals, DisplayPort signals, and High Definition Multimedia Interface (HDMI (registered trademark)) signals to and from the USB Type-C/PD device 2 This SoC 101 corresponds to an example of a "second control device".

The EC 102 implements, for example, the functions of the state acquiring unit 12, the storage unit 151, and the port setting management unit 152 that are illustrated in FIG. 1. The EC 102 includes, for example, the power reception and delivery determination table 511 and the port attribute table 512 that are illustrated in FIG. 1.

The EC 102 receives input of an AC adapter detection signal. The EC 102 is connected to the SoC 101 by, for example, circuitry illustrated in FIG. 5. FIG. 5 is a circuit diagram for explaining an example of a method for power supply state notification. As illustrated in FIG. 5, the EC 102 is provided with a path that includes a pull-up resistor 202 and a pull-up power supply 201 connected to each other. A path that leads to the pull-up power supply 201 is grounded through three paths to which respective resistors 203, 204, and 205 that have different resistance values are connected.

A field effect transistor (FET) switch 206 is interposed between the resistor 203 and the ground. An FET switch 207 is interposed between the resistor 204 and the ground. An FET switch 208 is interposed between the resistor 205 and the ground.

The respective gates of the FET switches 206, 207, and 208 are connected to the SoC 101. When the power supply state is S3, the SoC 101 applies voltage to the gate of the FET switch 208. When the power supply state is S4 or S5, the SoC 101 applies voltage to the FET switch 207. When the power supply state is G3, the SoC 101 applies voltage to the FET switch 206. With the FET switch 206 switched on, divided voltage between the pull-up resistor 202 of voltage output from the pull-up power supply 201 and the resistor 203 is input to the EC 102. With the FET switch 207 switched on, divided voltage between the pull-up resistor 202 of voltage output from the pull-up power supply 201 and the resistor 204 is input to the EC 102. With the FET switch 208 switched on, divided voltage between the pull-up resistor 202 of voltage output from the pull-up power supply 201 and the resistor 205 is input to the EC 102.

Because the resistors 203 to 205 have different resistance values, voltage that is input to the EC 102 varies depending on which of the FET switches 206 to 208 is switched on. Thus, the EC 102 can acquire the power supply state of the information processing apparatus 1 based on the input voltage.

The EC 102 further receives, from the charger 133, input of information on the insertion state of the AC adapter 131.

Additionally, the EC 102 communicates with the PD controller 103 by using the I2C. Upon detecting a change in the insertion state of the AC adapter 131 or a change in the power supply state of the information processing apparatus 1, the EC 102 resets the PD controller 103. When the PD controller 103 is in the power reception mode, the EC 102 cancels the power reception mode. The EC 102 initializes the PD controller 103.

When the power supply state is S0 or S3, or when the power supply state is S4, S5, or G3 with insertion of the AC adapter 131 (that is, power is being delivered from the AC adapter 131), the EC 102 acquires the selection mode as the operation mode from the power reception and delivery determination table 511. The EC 102 acquires information on settings for the selection mode from the port attribute table 512. The EC 102 then sets the PD controller 103 into the selection mode.

In contrast, when the power supply state is S4, S5, or G3 without insertion of the AC adapter 131 (that is, power is not being delivered from the AC adapter 131), the EC 102 instructs the PD controller 103 to disable reception of a notification that the direction of power delivery be changed. Specifically, the EC 102 clears a power reception mode bit, which is a bit signifying the power reception mode, in a register included in the PD controller 103. The EC 102 acquires, from the power reception and delivery determination table 511, the power reception mode as the operation mode to be set when the power state is S4, S5, or G3 without insertion of the AC adapter 131. The EC 102 acquires information on settings applicable in the power reception mode from the port attribute table 512. The EC 102 then sets the PD controller 103 into the power reception mode. The EC 102 retains the operation mode of the PD controller 103 in the power reception mode. The operation mode, which is retained in the power reception mode, corresponds to an example of a "first mode".

Other than the above cases, there may be cases where the information processing apparatus 1 is instructed by an operator about the operation mode. In such cases, the EC 102 acquires information on settings corresponding to the operation mode specified by the operator from the port attribute table 512. The EC 102 then sets the PD controller 103 into the operation mode thus specified. For example, when the operator specifies the power delivery mode as the operation mode, the EC 102 sets the PD controller 103 into the power delivery mode. This EC 102 corresponds to an example of a "third control device".

The PD controller 103 implements, for example, the functions of the Type-C control unit 153 and the UPD control unit 154 that are illustrated in FIG. 1. Specifically, the PD controller 103 executes detection of the USB Type-C/PD device 2 and Power Delivery communication.

Furthermore, the PD controller 103 performs communication with the USB Type-C/PD device 2 via the Type-C port 16 by using sideband signals. The PD controller 103 transmits and receives sideband signals over a configuration channel (CC). The PD controller 103 is able to determine a direction of power delivery based on a state of pull-up or pull-down of a pin connected to the CC and a divided voltage value that is found when the USB Type-C/PD device 2 is connected.

Figure 6:
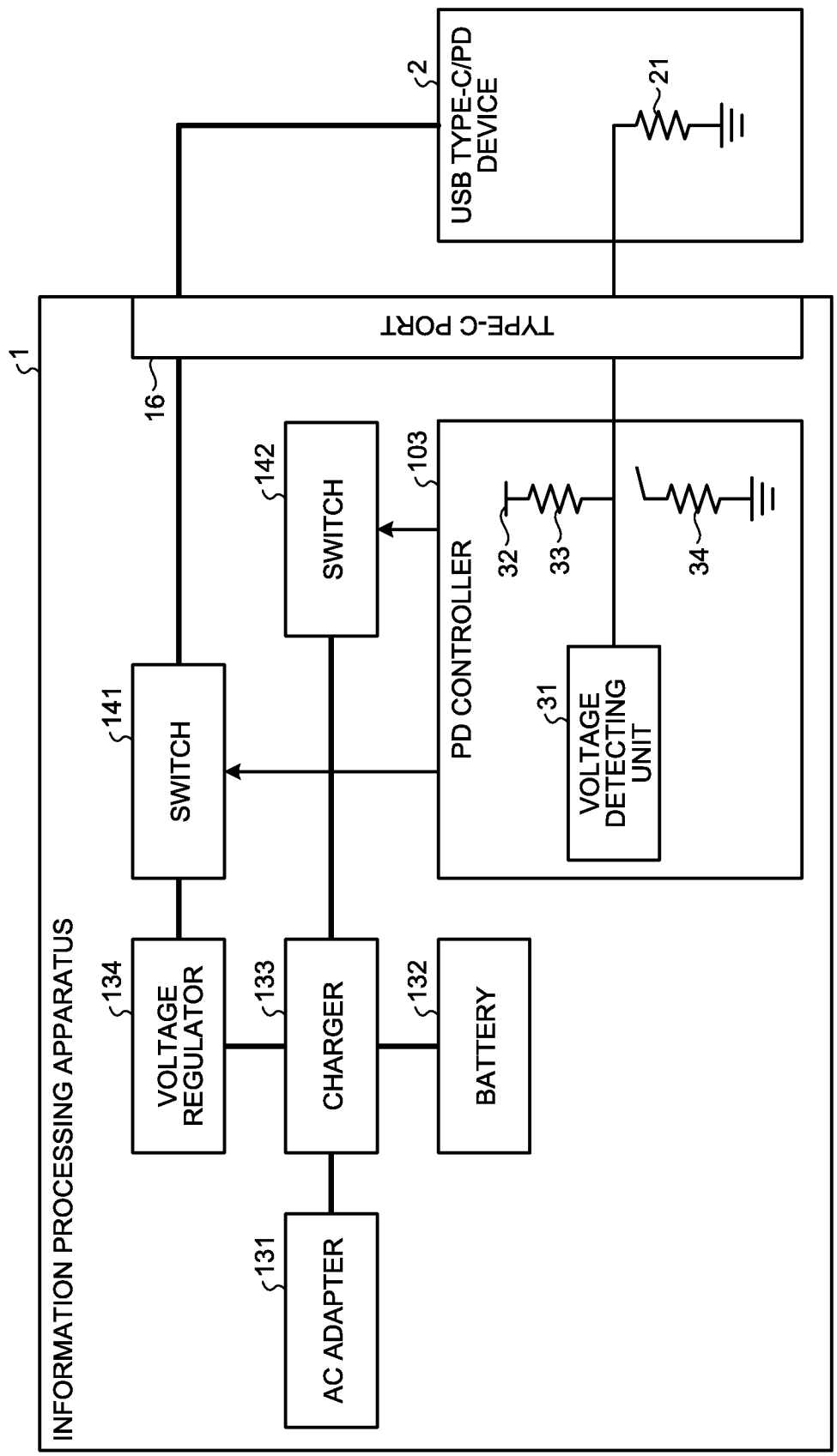
FIG. 6 is a diagram representing a state of the information processing apparatus in a power delivery mode.
Figure 7:
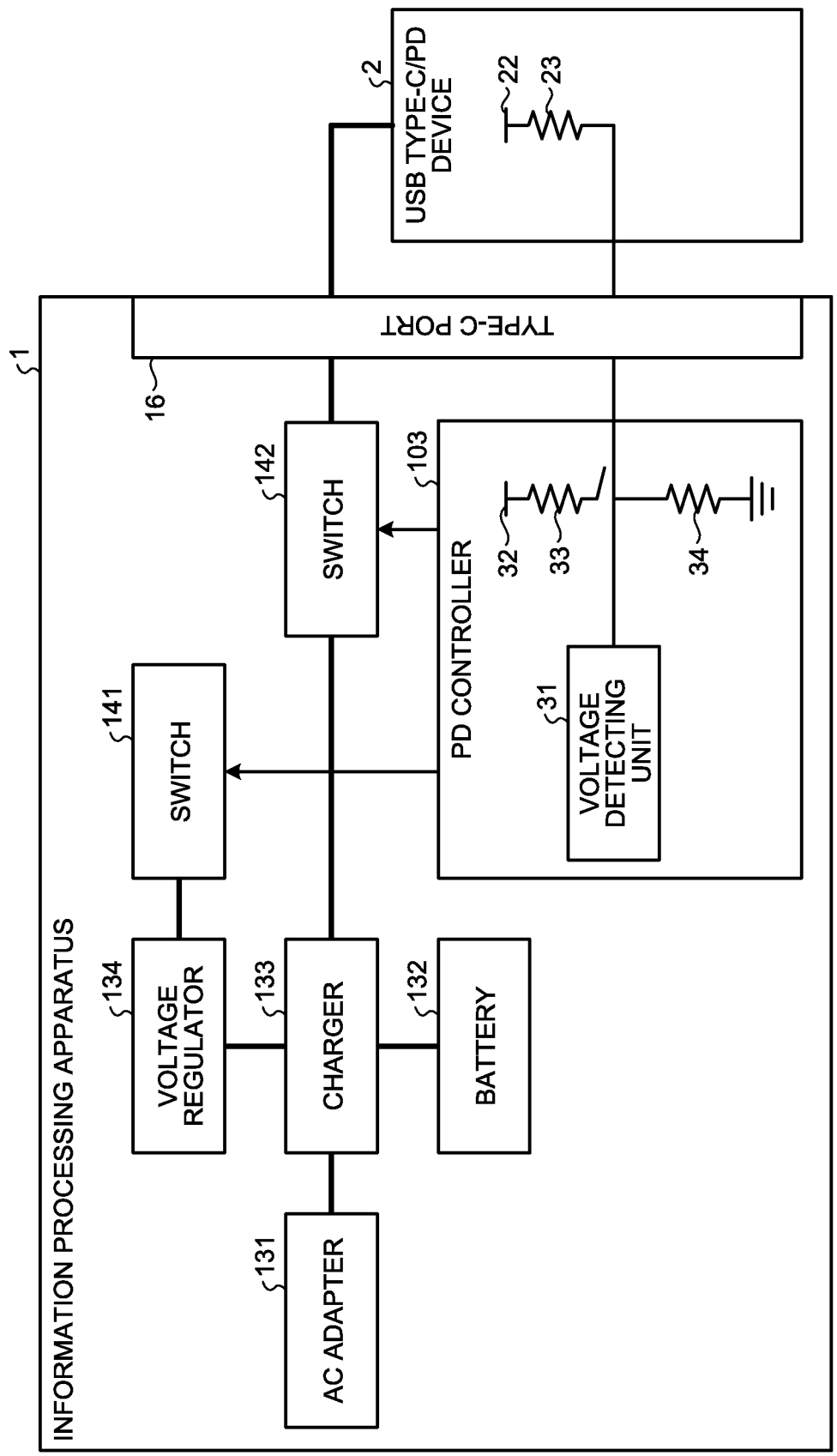
FIG. 7 is a diagram representing a state of the information processing apparatus in a power reception mode.

States of the PD controller 103 in operation will be described with reference to FIGS. 6 and 7. FIG. 6 is a diagram representing states of the information processing apparatus in the power delivery mode. FIG. 7 is a diagram representing a state of the information processing apparatus in the power reception mode.

As illustrated in FIG. 6 and FIG. 7, the PD controller 103 includes a voltage detecting unit 31 connected to the CC that is connected to the USB Type-C/PD device 2. The PD controller 103 further includes a pull-up power supply 32 and a pull-up resistor 33 that can each be switched between being connected and being disconnected to the CC. The pull-up power supply 32 is set to, for example, 3.0 V. The PD controller 103 further includes a pull-down resistor 34 that can be switched between being connected and being disconnected to the CC and that is grounded.

In the power delivery mode, as illustrated in FIG. 6, the pull-up power supply 32 and the pull-up resistor 33 are connected to the CC while the pull-down resistor 34 is disconnected from the CC. The voltage detecting unit 31 then detects voltage fixed at a certain voltage value by the pull-up power supply 32 when a device that includes a pull-down resistor 21 is connected to the PD controller 103 via the CC. In this case, the PD controller 103 turns the switch 141 on and the switch 142 off. The Type-C port 16 then operates so as to deliver power from the information processing apparatus 1 to the USB Type-C/PD device 2 when the voltage value detected by the voltage detecting unit 31 is within a range specified for the USB Type-C. Here, when the Type-C/PD device supports 3A for 0.85 to 2.45 V, the range of the voltage value specified for the USB Type-C covers 0.85 to 2.45 V.

In the power reception mode, as illustrated in FIG. 7, the pull-down resistor 34 is connected to the CC, and the pull-up power supply 32 and the pull-up resistor 33 are disconnected from the CC. When a device that includes a pull-up power supply 22 and a pull-up resistor 23 is then connected to the PD controller 103 via the CC, the voltage detecting unit 31 detects voltage that has been fixed at a certain voltage value by the pull-up power supply 22. In this case, the PD controller 103 turns the switch 142 on and the switch 141 off. When a voltage value detected by the voltage detecting unit 31 is within the range specified for the USB Type-C, the Type-C port 16 operates so as to deliver power from the USB Type-C/PD device 2 to the information processing apparatus 1.

In the selection mode, the PD controller 103 is repeatedly switched between two states: one in which the pull-up power supply 32 and the pull-up resistor 33 are connected to the CC; and the other in which the pull-down resistor 34 is connected to the CC. That is, the PD controller 103 is repeatedly switched between the state illustrated in FIG. 6 and the state illustrated in FIG. 7. When the connected USB Type-C/PD device 2 includes the pull-down resistor 21, the state of the PD controller 103 is retained as illustrated in FIG. 6, which is similar to the power reception mode. When the connected USB Type-C/PD device 2 includes the pull-up power supply 22 and the pull-up resistor 23, the state of the PD controller 103 is retained as illustrated in FIG. 7, which is similar to the power reception mode.

Accordingly, when the EC 102 specifies the selection mode as the operation mode, the PD controller 103 is in a state repeatedly switched between the state illustrated in FIG. 6 and the state illustrated in FIG. 7. When the EC 102 specifies the power reception mode as the operation mode, the PD controller 103 is in the state illustrated in FIG. 6.

Returning to FIGS. 3 and 4, when the power supply state is S4, S5, or G3 without insertion of the AC adapter 131, the PD controller 103 is notified by the EC 102 to disable reception of a notification that the direction of power delivery be changed and disables reception of a notification that the direction of power delivery be changed. Thereafter, the PD controller 103 retains the power reception mode even when receiving, from the USB Type-C/PD device 2 or the EC 102, notification that the direction of power delivery be changed. Thus, the PD controller 103 retains the operation mode in the power reception mode. The PD controller 103 corresponds to an example of a "first control device" and also to an example of a "control circuit".

Figure 8:
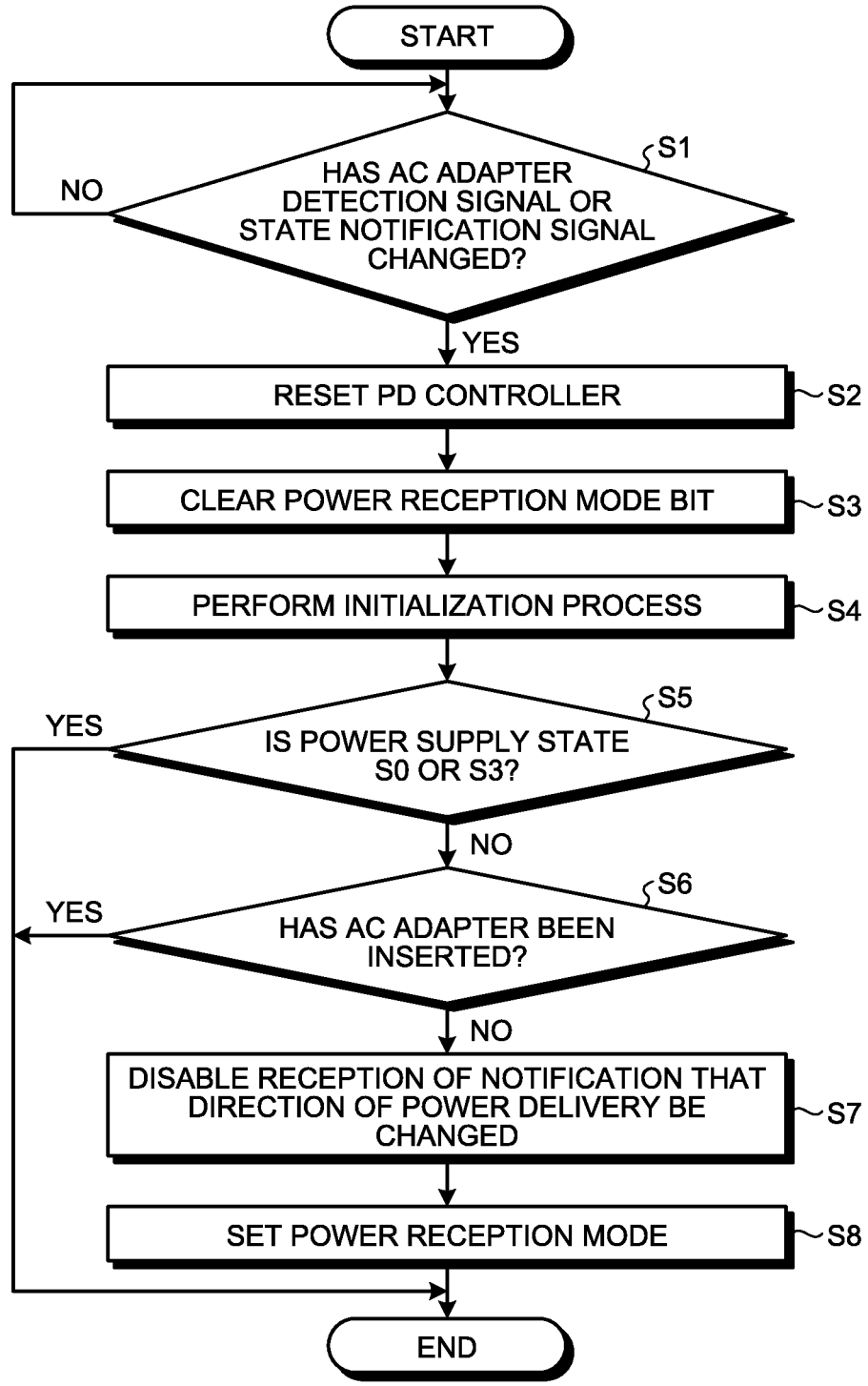
FIG. 8 is a flowchart of power reception and delivery control performed by the information processing apparatus according to the first embodiment.

With reference to FIG. 8, a description will be given of the procedure of power reception and delivery control that the information processing apparatus 1 according to the present embodiment performs. FIG. 8 is a flowchart of power reception and delivery control performed by the information processing apparatus according to the first embodiment. In the following description, the individual hardware components illustrated in FIG. 4 serve as subjects of operation.

The EC 102 determines whether at least one of an AC adapter detection signal input from the charger 133 and a state notification signal input from the SoC 101 has changed (Step S1). If both of the AC adapter detection signal and the state notification signal have not changed (No at Step S1), the EC 102 waits until at least one of the AC adapter detection signal and the state notification signal changes.

In contrast, if at least one of the AC adapter detection signal and the state notification signal has changed (Yes at Step S1), the EC 102 resets the PD controller 103 (Step S2).

Furthermore, the EC 102 clears the power reception mode bit in the PD controller 103, thereby canceling the power reception mode (Step S3).

The EC 102 performs a process for initializing the PD controller 103 (Step S4).

The EC 102 determines whether or not the power supply state of the information processing apparatus 1 is S0 or S3 (Step S5). When the power supply state is S0 or S3 (Yes at Step S5), the EC 102 terminates the power reception and delivery control. In this case, the PD controller 103 operates in the selection mode since it has been initialized.

In contrast, when the power supply state is S4, S5 or G3 (No at Step S5), the EC 102 determines whether the AC adapter 131 has been inserted (Step S6). When the AC adapter 131 has been inserted (Yes at Step S6), the EC 102 terminates the power reception and delivery control. In this case, the PD controller 103 operates in the selection mode because it has been initialized.

When the AC adapter 131 has not been inserted (No at Step S6), the EC 102 notifies the PD controller 103 to disable reception of a notification that the direction of power delivery be changed. The PD controller 103 disables the reception of a notification that the direction of power delivery be changed (Step S7).

The EC 102 sets the operation mode to the power reception mode by using the power reception mode bit in the PD controller 103 (Step S8).

As described above, the information processing apparatus according to the present embodiment determines the operation mode to be applied to the Type-C port based on the power supply state of the information processing apparatus and the insertion state of the AC adapter. The power reception mode is retained only when the information processing apparatus is in a non-working state and the AC adapter has not been inserted. Therefore, power in the battery can be prevented from being exhausted by being delivered to an expansion device which does not need power reception. The information processing apparatus, even in a non-working state, enables power to be delivered to an expansion device and to be received by the information processing apparatus. Thus, the information processing apparatus according to the present embodiment can perform efficient power reception and delivery.

Second Embodiment

A second embodiment will be described. An information processing apparatus according to the present embodiment is different from the one in the first embodiment in that, a determination as to whether the power reception mode is set is made in consideration of the remaining battery level as well. The information processing apparatus according to the present embodiment is represented by FIG. 1 and FIG. 4. Functions of the information processing apparatus 1 according to the present embodiment are described below mainly with reference to FIG. 4. Descriptions are omitted of functions of the same components as those in the first embodiment.

The battery 132 notifies the EC 102 of the remaining battery level. Alternatively, the EC 102 may acquire information on the remaining battery level via the charger 133.

The EC 102 previously has a remaining level threshold to determine whether to set the power reception mode. For example, the EC 102 stores 50% of the fully charged state of the battery 132 as the remaining level threshold. The EC 102 receives a notification of the remaining battery level from the battery 132. When the power supply state is S4, S5, or G3 without insertion of the AC adapter 131, the EC 102 determines whether the remaining battery level is less than the remaining level threshold. When the remaining battery level is not less than remaining level threshold, the EC 102 sets the operation mode of the PD controller 103 to the selection mode.

On the other hand, when the remaining battery level is less than the remaining level threshold, the EC 102 notifies the PD controller 103 to disable reception of a notification that the direction of power delivery be changed. Furthermore, the EC 102 sets the operation mode of the PD controller 103 to the power reception mode.

In the present embodiment, the port setting management unit 152 in FIG. 1 determines whether the remaining battery level is less than the remaining level threshold. Alternatively, another configuration may be employed. For example, while the state acquiring unit 12 may perform the determination and output the determination result to the port setting management unit 152, the port setting management unit 152 may use the determination result acquired from the state acquiring unit 12 to determine whether to set the power reception mode.

Figure 9:
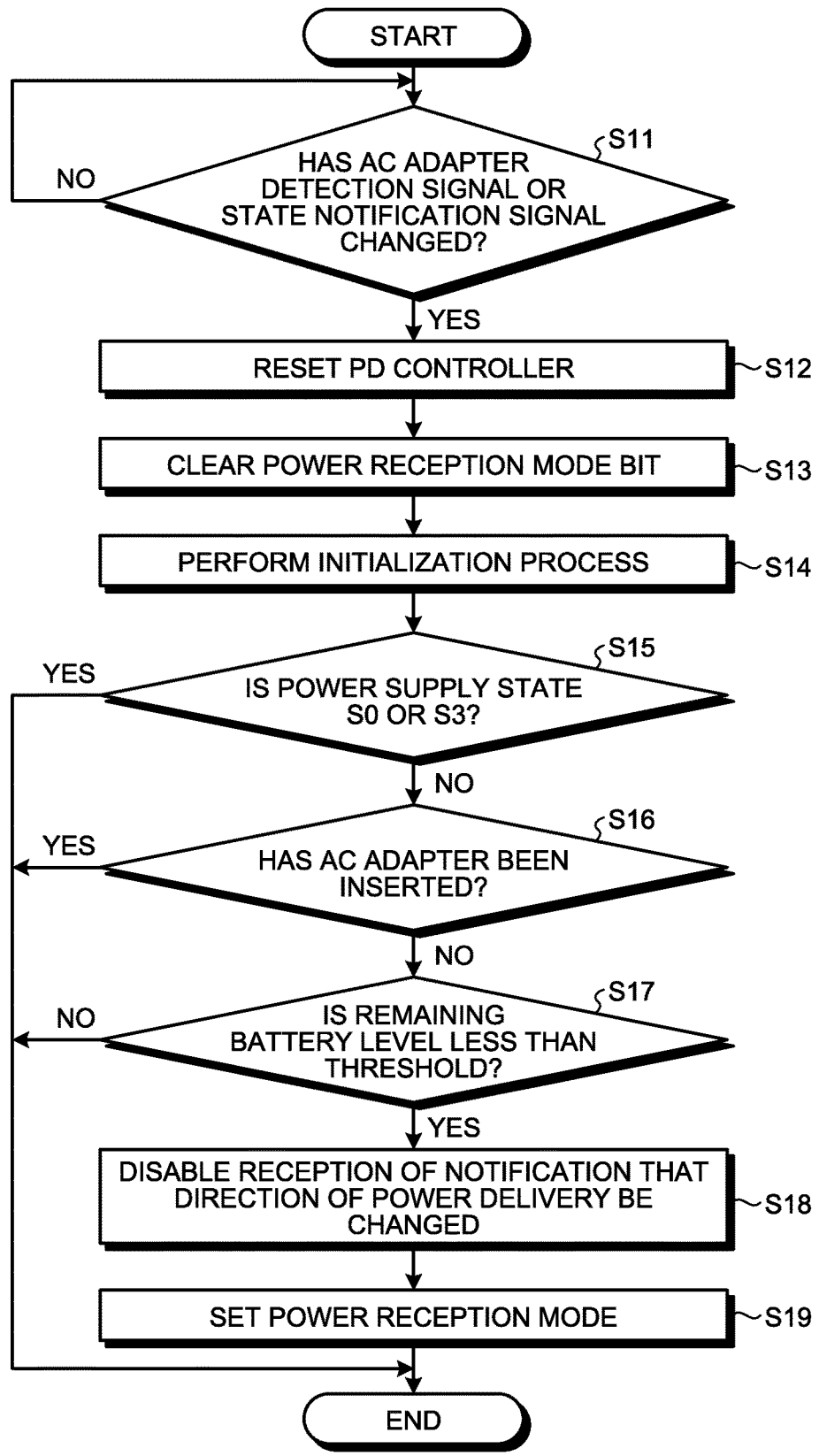
FIG. 9 is a flowchart of power reception and delivery control performed by an information processing apparatus according to a second embodiment.

With reference to FIG. 9, a description is given of the procedure of power reception and delivery control that the information processing apparatus 1 according to the present embodiment performs. FIG. 9 is a flowchart of power reception and delivery control performed by the information processing apparatus according to the second embodiment.

The EC 102 determines whether an AC adapter detection signal input from the charger 133 or a state notification signal input from the SoC 101 has changed (Step S11). When both of the AC adapter detection signal and the state notification signal have not changed (No at Step S11), the EC 102 waits until the AC adapter detection signal or the state notification signal changes.

In contrast, when the AC adapter detection signal or the state notification signal has changed (Yes at Step S11), the EC 102 resets the PD controller 103 (Step S12).

The EC 102 clears the power reception mode bit for the PD controller 103, thereby canceling the power reception mode (Step S13).

The EC 102 performs a process for initializing the PD controller 103 (Step S14).

The EC 102 determines whether or not the power supply state of the information processing apparatus 1 is either S0 or S3 (Step S15). When the power supply state is S0 or S3 (Yes at Step S15), the EC 102 terminates the power reception and delivery control. In this case, the PD controller 103 operates in the selection mode because it has been initialized.

In contrast, when the power supply state is S4, S5, or G3 (No at Step S15), the EC 102 determines whether the AC adapter 131 has been inserted (Step S16). When the AC adapter 131 has been inserted (Yes at Step S16), the EC 102 terminates the power reception and delivery control. In this case, the PD controller 103 operates in the selection mode because it has been initialized.

On the other hand, when the AC adapter 131 has not been inserted (No at Step S16), the EC 102 further determines whether the remaining battery level of the battery 132 is less than the remaining level threshold (Step S17). When the remaining battery level is not less than remaining level threshold (No at Step S17), the EC 102 terminates the power reception and delivery control. In this case, the PD controller 103 operates in the selection mode because it has been initialized.

When the remaining battery level is less than the remaining level threshold (Yes at Step S17), the EC 102 notifies the PD controller 103 to disable reception of a notification that the direction of power delivery be changed. The PD controller 103 disables reception of a notification that the direction of power delivery be changed (Step S18).

The EC 102 sets the operation mode to the power reception mode by using the power reception mode bit in the PD controller 103 (Step S19).

As described above, the information processing apparatus according to the present embodiment determines whether to retain the power reception mode for the Type-C port depending on the remaining level of the battery. This configuration makes it possible to stop power delivery to the battery in the presence of a sufficient remaining battery level and thereby restrain degradation of the battery.

Third Embodiment

Figure 10:
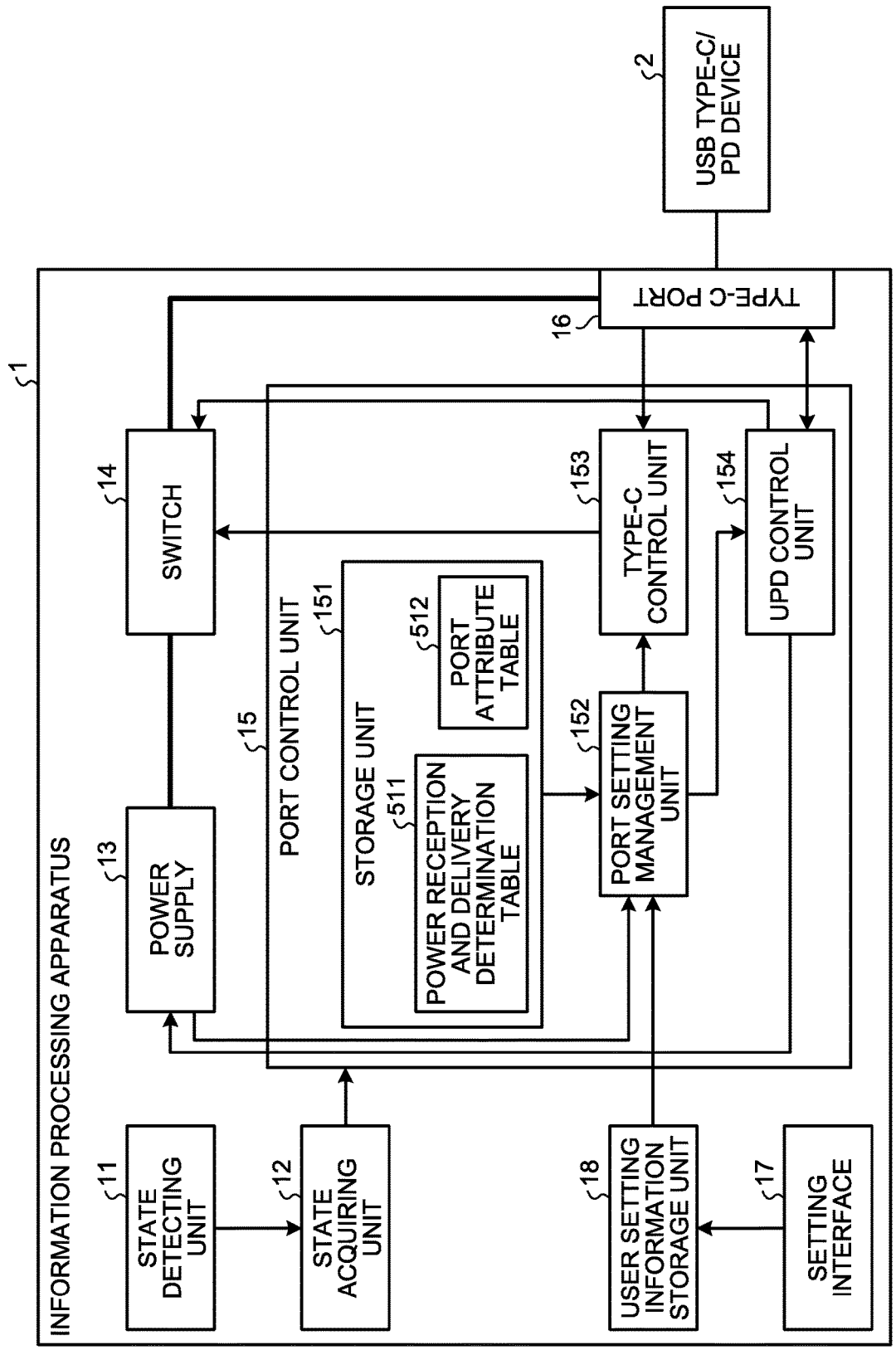
FIG. 10 is a block diagram of an information processing apparatus according to a third embodiment.

FIG. 10 is a block diagram of an information processing apparatus according to a third embodiment. The information processing apparatus 1 according to the present embodiment differs from the one in the first embodiment in that, an instruction from an operator as to whether to execute a process of retaining the power reception mode is reflected in a determination on setting the power reception mode. The hardware configuration of the information processing apparatus 1 according to the present embodiment is represented by FIG. 4. Hereinafter, descriptions are omitted of functions of the same components as those in the first embodiment.

The information processing apparatus 1 according to the present embodiment includes a setting interface 17 and a user setting information storage unit 18.

The function of the setting interface 17 is implemented by, for example, the input device 105. The input device 105 is, for example, a keyboard or a mouse. The operator uses the setting interface 17 to input an instruction on whether to approve power reception in the power supply state of the information processing apparatus 1 being S4, S5, or G3.

The user setting information storage unit 18 is implemented by, for example, the ROM 104. The user setting information storage unit 18 stores information, which is input via the setting interface 17, on whether to approve power reception when the power supply state of the information processing apparatus 1 is S4, S5, or G3. The user setting information storage unit 18 and the ROM 104 implementing the function thereof correspond to examples of a "memory".

In the power reception and delivery determination table 511, each operation mode of the Type-C control unit 153 and the UPD control unit 154 is set to the selection mode when power reception has not been approved in the power supply state of the information processing apparatus 1 being S4, S5, or G3. In the power reception and delivery determination table 511, each operation mode of the Type-C control unit 153 and the UPD control unit 154 is set to the reception mode when power reception has been approved in the power supply state of the information processing apparatus 1 being S4, S5, or G3.

When the power supply state is S4, S5, or G3 without insertion of the AC adapter 131, the port setting management unit 152 acquires, from the user setting information storage unit 18, information on whether to approve power reception in the power supply state of the information processing apparatus 1 being S4, S5, or G3. When power reception in the power supply state of the information processing apparatus 1 being S4, S5, or G3 has not been approved, the port setting management unit 152 then acquires the selection mode as the operation mode of the Type-C control unit 153 and the UPD control unit 154 from the power reception and delivery determination table 511. When power reception in the power supply state of the information processing apparatus 1 being S4, S5, or G3 has been approved, the port setting management unit 152 then acquires the reception mode as the operation mode of the Type-C control unit 153 and the UPD control unit 154 from the power reception and delivery determination table 511.

Figure 11:
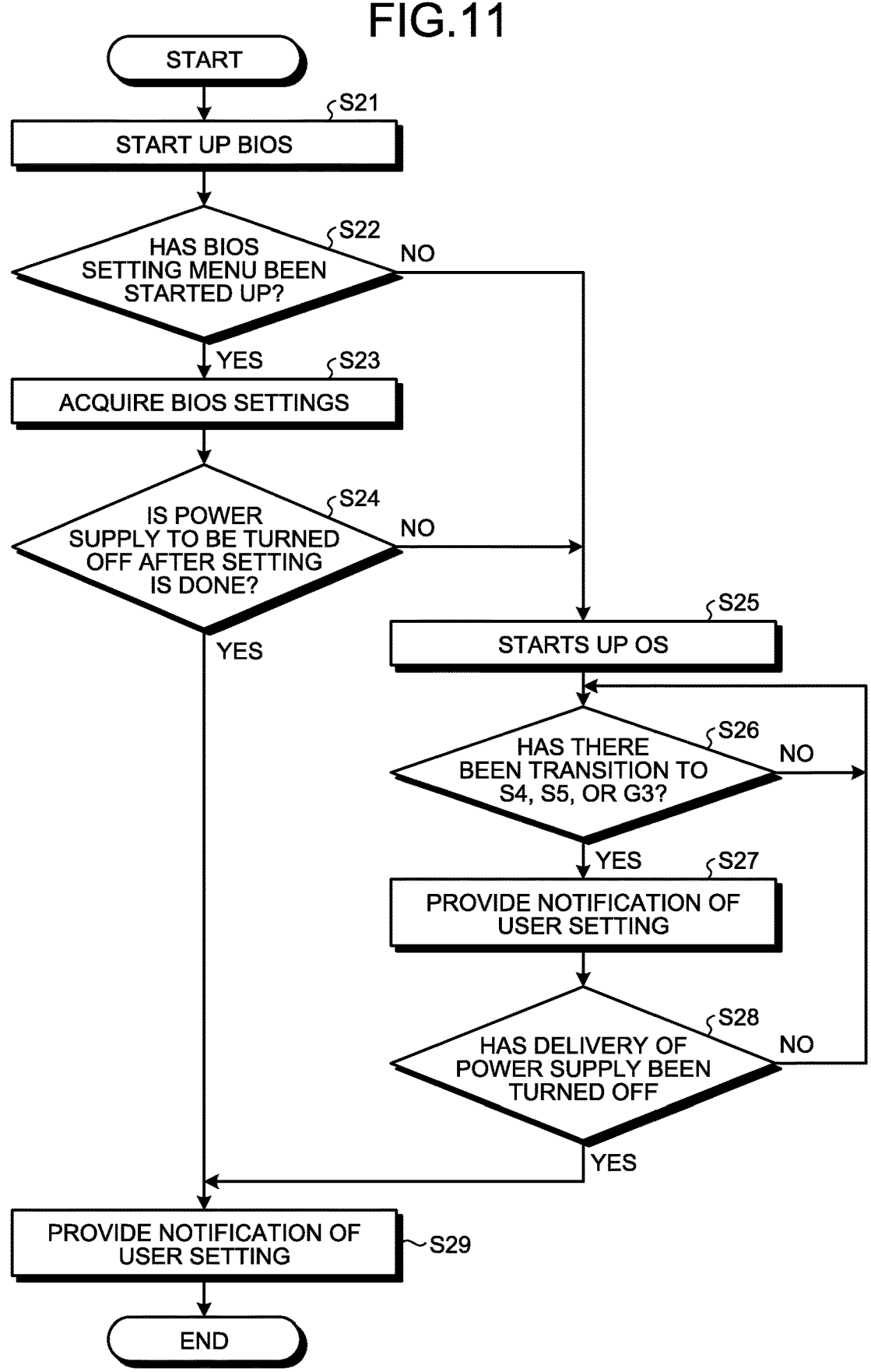
FIG. 11 is a flowchart of a user setting acquisition process performed by the information processing apparatus according to the third embodiment.

With reference to FIG. 11, a description is given of the procedure of a user setting acquisition process performed by the information processing apparatus 1 according to the present embodiment. FIG. 11 is a flowchart of the user setting acquisition process performed by the information processing apparatus according to the third embodiment. In the following description, the individual hardware components illustrated in FIG. 4 serve as subjects of operation.

The SoC 101 starts up the BIOS stored in the ROM 104 (Step S21).

The SoC 101 determines whether a BIOS setting menu has been started up (Step S22).

When the BIOS setting menu has been started up (Yes at Step S22), the SoC 101 acquires BIOS settings (Step S23).

Depending on whether or not input of an instruction to turn the power supply off has been received after input of settings from the operator, the SoC 101 determines whether to turn the power supply off after the input of settings from the operator (Step S24). When the power supply is to be turned off after the input of settings from the operator (Yes at Step S24), the SoC 101 proceeds to Step S29.

When the power supply is not to be turned off after the input of settings from the operator (No at Step S24) or the BIOS setting menu has not been started up (Yes at Step S22), the SoC 101 starts up the OS (Step S25).

The SoC 101 determines whether or not the power supply state has transitioned to any of S4, S5, or G3 (Step S26). When the power supply state has not transitioned to any of S4, S5, or G3 (No at Step S26), the SoC 101 waits until the power supply state transitions to any of S4, S5, or G3.

In contrast, when the power supply state has transitioned to any of S4, S5, or G3 (Yes at Step S26), the SoC 101 notifies the EC 102 of the user setting on whether to approve power reception in the power supply state of the information processing apparatus 1 being S4, S5, or G3 (Step S27).

Thereafter, the SoC 101 determines whether delivery of power supply of the information processing apparatus 1 has been turned off (Step S28). When the delivery of power supply has not been turned off (No at Step S28), the SoC 101 returns to Step S26.

In contrast, when the delivery of power supply has not been turned off (Yes at Step S28), the SoC 101 notifies the EC 102 of the user setting on whether to approve power reception in the power supply state of the information processing apparatus 1 being S4, S5, or G3 (Step S29). Thereafter, the SoC 101 causes the charger 133 to stop delivering power supply.

Figure 12:
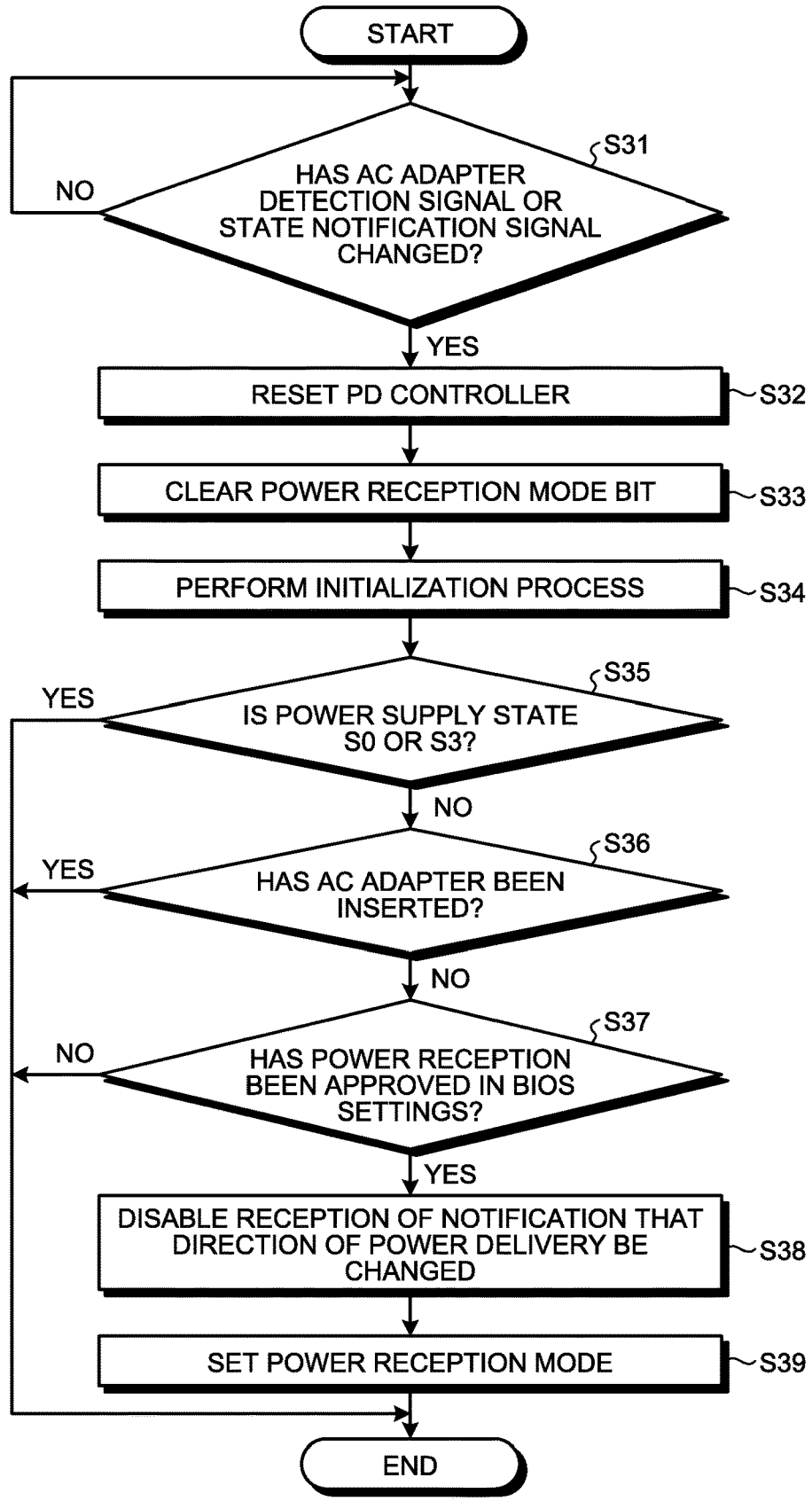
FIG. 12 is a flowchart of power reception and delivery control performed by the information processing apparatus according to the third embodiment.

With reference to FIG. 12, a description is given of the procedure of power reception and delivery control that the information processing apparatus 1 according to the present embodiment performs. FIG. 12 is a flowchart of power reception and delivery control performed by the information processing apparatus according to the third embodiment. In the following description, the individual hardware components illustrated in FIG. 4 serve as subjects of operation.

The EC 102 determines whether an AC adapter detection signal input from the charger 133 or a state notification signal input from the SoC 101 has changed (Step S31). When both of the AC adapter detection signal and the state notification signal have not changed (No at Step S31), the EC 102 waits until the AC adapter detection signal or the state notification signal changes.

On the other hand, when the AC adapter detection signal or the state notification signal has changed (Yes at Step S31), the EC 102 resets the PD controller 103 (Step S32).

The EC 102 clears the power reception mode bit in the PD controller 103, thereby canceling the power reception mode (Step S33).

The EC 102 performs a process for initializing the PD controller 103 (Step S34).

The EC 102 determines whether or not the power supply state of the information processing apparatus 1 is either S0 or S3 (Step S35). When the power supply state is S0 or S3 (Yes at Step S35), the EC 102 terminates the power reception and delivery control. In this case, the PD controller 103 operates in the selection mode because it has been initialized.

In contrast, when the power supply state is S4, S5, or G3 (No at Step S35), the EC 102 determines whether the AC adapter 131 has been inserted (Step S36). When the AC adapter 131 has been inserted (Yes at Step S36), the EC 102 terminates the power reception and delivery control. In this case, the PD controller 103 operates in the selection mode because it has been initialized.

When the AC adapter 131 has not been inserted (No at Step S36), the EC 102 determines whether power reception in the power supply state being S4, S5, or G3 has been approved in the BIOS settings (Step S37). When power reception in the power supply state being S4, S5, or G3 has not been approved (No at Step S37), the EC 102 terminates the power reception and delivery control. In this case, the PD controller 103 operates in the selection mode because it has been initialized.

In contrast, when power reception in the power supply state being S4, S5, or G3 has been approved (Yes at Step S37), the EC 102 notifies the PD controller 103 to disable reception of a notification that the direction of power delivery be changed. The PD controller 103 disables reception of a notification that the direction of power delivery be changed (Step S38).

The EC 102 sets the operation mode to the power reception mode by using the power reception mode bit in the PD controller 103 (Step S39).

As described above, the information processing apparatus according to the present embodiment determines whether to retain the power reception mode for the Type-C port in accordance with the BIOS settings. This configuration allows an instruction from the operator to be reflected in transition of the operation mode, thereby enabling operation requested by the operator to be implemented.

Fourth Embodiment

A fourth embodiment will be described. An information processing apparatus according to the present embodiment is different from the one according to the third embodiment in that, when the USB Type-C/PD device is a device that delivers power, the operation mode is not changed even if the power supply state has transitioned. The information processing apparatus according to the present embodiment is represented by FIG. 10 and FIG. 4. Functions of the information processing apparatus 1 according to the present embodiment are described below mainly with reference to FIG. 4. Descriptions are omitted of functions of the same components as those in the third embodiment. While the following description is on the assumption that functions are added in the information processing apparatus 1 according to the third embodiment, the functions is also operable by being added to the information processing apparatus 1 according to the first or the second embodiment.

The EC 102 has a power reception mode bit indicating whether a constraint on transition to the power reception mode has been enabled or disabled. When the power reception mode bit is set up, a constraint on transition to the power reception mode is enabled. When the power reception mode bit has not been set up, a constraint on transition to the power reception mode has been disabled.

The EC 102 further has an operation table 301 illustrated in FIG. 13, which is used when a device is disconnected from the information processing apparatus 1, and an operation table 302 illustrated in FIG. 14, which is used when transition of a power supply state occurs. FIG. 13 is a diagram of an example of the operation table used when a device is disconnected. FIG. 14 is a diagram of an example of an operation table used when transition of a power supply state occurs. Herein, when the description is made as that the power reception mode has been enabled or disabled, it means that power delivery in the power supply state being S4, S5, or G3 has been set enabled or disabled in the BIOS settings.

The EC 102 operates in accordance with the operation table 301 illustrated in FIG. 13 when the USB Type-C/PD device 2 is disconnected from the information processing apparatus 1. That is, when the power supply state is S0 or S3 and the power reception mode bit has not been set up, the EC 102 does not change the operation mode of the PD controller 103 and retains a normal mode regardless of whether or not the power reception mode has been enabled. Note that the normal mode refers to a mode where the selection mode is executed and the selection mode is changed to the power reception mode or the power delivery mode when the USB Type-C/PD device 2 is connected. In this case, the PD controller 103 is not reset. In contrast, when the power supply state is S0 or S3 and the power reception mode bit has been set up, the EC 102 cancels the power reception mode of the PD controller 103 and resets the PD controller 103 regardless of whether or not the power reception mode has been enabled.

When the power supply state is S4, S5, or G3, the EC 102 determines whether the power reception mode has been disabled. When the power reception mode has been disabled and the power reception mode bit has not been set up, the EC 102 does not change the operation mode of the PD controller 103 and retains the normal mode. In this case, the PD controller 103 is not reset. When the power reception mode has been disabled and the power reception mode bit has been set up, the EC 102 cancels the power reception mode for the PD controller 103 and resets the PD controller 103. When the power reception mode has been enabled and the power reception mode bit has not been set up, the EC 102 executes later-described power reception and delivery control. Furthermore, when the power reception mode has been enabled and the power reception mode bit has been set up, the EC 102 retains the operation mode of the PD controller 103 at the power reception mode. In this case, the PD controller 103 is not reset.

The EC 102 operates in accordance with the operation table 302 illustrated in FIG. 14 when the power supply state changes. That is, when transition of the power supply state from S0 to S3 occurs, the EC 102 does not change the operation mode of the PD controller 103 and retains the normal mode regardless of whether or not the power reception mode bit has been enabled and regardless of whether the power reception mode bit has been set up. In this case, the PD controller 103 is not reset. Also when transition of the power supply state from S3 to S0 occurs, the EC 102 does not change the operation mode of the PD controller 103 and retains the normal mode regardless of whether or not the power reception mode has been enabled and regardless of whether the power reception mode bit has been set up. In this case, the PD controller 103 is not reset.

Next, it is assumed that transition of the power supply state from S0 to any of S4, S5, or G3 occurs. When the power reception mode has been disabled without a setup of the power reception mode bit, the EC 102 does not change the operation mode of the PD controller 103 and retains the normal mode. In this case, the PD controller 103 is not reset. On the other hand, when the power reception mode has been disabled and the power reception mode bit has been set up, the EC 102 causes the voltage detecting unit 31 of the PD controller 103 to detect voltage. When a voltage value detected by the voltage detecting unit 31 is within a range specified for the USB Type-C, the EC 102 does not change the operation mode of the PD controller 103 and retains the normal mode. In this case, the PD controller 103 is not reset. When a voltage value detected by the voltage detecting unit 31 is not within the range specified for the USB Type-C, the EC 102 executes power reception and delivery control described later.

Further to the occurrence of the transition of the power supply state from S0 to any of S4, S5, or G3, when the power reception mode has been enabled without a setup of the power reception mode bit, the EC 102 causes the voltage detecting unit 31 of the PD controller 103 to detect voltage. When a voltage value detected by the voltage detecting unit 31 is within a range specified for USB Type-C, the EC 102 does not change the operation mode of the PD controller 103 and retains the operation mode depending on the connected Type-C/PD device 2. In this case, the PD controller 103 is not reset. When a voltage value detected by the voltage detecting unit 31 is not within the range specified for the USB Type-C, the EC 102 executes the power reception and delivery control to be described later. When the power reception mode has been enabled and the power reception mode bit has been set up, the EC 102 does not change the operation mode of the PD controller 103 and retains the operation mode that is depending on the connected Type-C/PD device 2. In this case, the PD controller 103 is not reset.

Next, it is assumed that transition of the power supply state from any of S4, S5, or G3 to S0 occurs. When the power reception mode has been disabled without a setup of the power reception mode bit, the EC 102 does not change the operation mode of the PD controller 103. That is, the EC 102 causes the PD controller 103 to retain the operation mode depending on the connected Type-C/PD device 2. In this case, the PD controller 103 is not reset. When the power reception mode has been disabled and the power reception mode bit has been set up, the EC 102 causes the voltage detecting unit 31 of the PD controller 103 to detect voltage. When a voltage value detected by the voltage detecting unit 31 is within a range specified for USB Type-C, the EC 102 does not change the operation mode of the PD controller 103 and retains the operation mode depending on the connected Type-C/PD device 2. In this case, the PD controller 103 is not reset. When a voltage value detected by the voltage detecting unit 31 is not within the range specified for the USB Type-C, the EC 102 executes the power reception and delivery control described later.

Further to the occurrence of the transition of the power supply state from any of S4, S5, or G3 to S0, when the power reception mode has been enabled without a setting of the power reception mode bit, the EC 102 causes the voltage detecting unit 31 of the PD controller 103 to detect voltage. When a voltage value detected by the voltage detecting unit 31 is within a range specified for USB Type-C, the EC 102 does not change the operation mode of the PD controller 103 and retains the operation mode depending on the connected Type-C/PD device 2. In this case, the PD controller 103 is not reset. When a voltage value detected by the voltage detecting unit 31 is not within the range specified for the USB Type-C, the EC 102 executes the power reception and delivery control to be described later. When the power reception mode has been enabled and the power reception mode bit has been set up, the EC 102 retains the state where the operation mode of the PD controller 103 is unchanged and retained in the power reception mode. In this case, the PD controller 103 is not reset.

Figure 15:
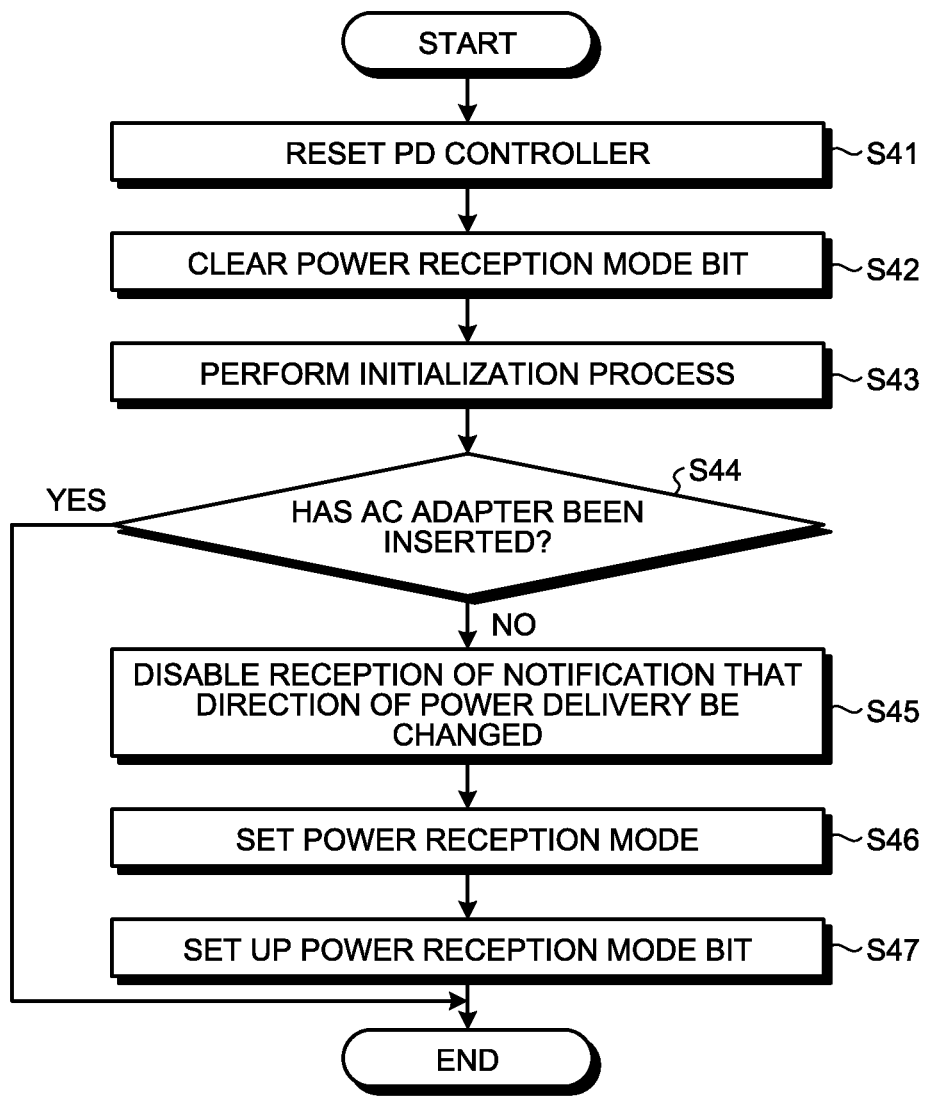
FIG. 15 is a flowchart of power reception and delivery control performed by an EC according to a fourth embodiment.

With reference to FIG. 15, a description is given of power reception and delivery control that the EC 102 according to the present embodiment performs. FIG. 15 is a flowchart of power reception and delivery control performed by the EC according to the fourth embodiment. The process in FIG. 15 is a process that the EC 102 performs for power reception and delivery control after performing the above-described process according to the operation table 301 illustrated in FIG. 13 and the operation table 302 illustrated in FIG. 14.

The EC 102 resets the PD controller 103 (Step S41).

Additionally, the EC 102 clears the power reception mode bit for the PD controller 103, thereby canceling the power reception mode (Step S42).

The EC 102 performs a process for initializing the PD controller 103 (Step S43).

The EC 102 determines whether the AC adapter 131 has been inserted (Step S44). When the AC adapter 131 has been inserted (Yes at Step S44), the EC 102 ends the power reception and delivery control. In this case, the PD controller 103 operates in the selection mode because it has been initialized.

In contrast, when the AC adapter 131 has not been inserted (No at Step S44), the EC 102 notifies the PD controller 103 to disable reception of a notification that the direction of power delivery be changed. The PD controller 103 disables reception of a notification that the direction of power delivery be changed (Step S45).

The EC 102 sets the operation mode to the power reception mode by using the power reception mode bit in the PD controller 103 (Step S46).

Furthermore, the EC 102 sets up the power reception mode bit (Step S47).

As described above, the information processing apparatus according to the present embodiment is able to restrict the resetting of the PD controller by setting up the power reception mode bit. Some information processing apparatuses employ a battery protection scheme that the battery is not recharged when power delivery to the battery is stopped while a remaining battery level is more than a preset level. In such the information processing apparatus, if the PD controller is reset when transition of the power supply state occurs, power delivery to the battery is temporarily stopped, whereby recharging is disabled. For addressing such inconvenience, the information processing apparatus according to the present embodiment is configured not to change the operation mode when transition of the power supply state occurs in the non-working state while a USB Type-C/PD device has been connected, which is a device to deliver power. Additionally, in the case where the operation mode has not been switched when transition of the power supply state occurs, the information processing apparatus according to the present embodiment recognizes absence of a power delivery source and switches the operation mode by detecting disconnection of the USB Type-C/PD device as a trigger. According to this configuration, the information processing apparatus according to the present embodiment does not reset the PD controller while receiving power delivery from the USB Type-C/PD device, thereby making it possible to avoid battery charging from stopping halfway through.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
   a first control device that controls, in accordance with an operation mode, power reception from an external device and power delivery to the external device, wherein the external device is connected to the information processing apparatus;
   a battery that is recharged by an external power supply or the external device;
   a second control device that acquires a power supply state of the information processing apparatus; and
   a third control device that:
      determines whether power is being delivered from the external power supply to the information processing apparatus; and
      sets the operation mode of the first control device to a first mode based on the power supply state and on a result of the determination, wherein the first mode is an operation mode in which the power reception alone is enabled between the power reception from the external device and the power delivery to the external device.

2. The information processing apparatus according to claim 1, wherein the third control device sets the operation mode of the first control device to the first mode when the power supply state of the information processing apparatus is a power-saving state or a power supply off state while power is not being delivered to the information processing apparatus from the external power supply.

3. The information processing apparatus according to claim 1, wherein the third control device:
   determines, based on a charging status of the battery in addition to the power supply state and the result of the determination, whether to set the operation mode of the first control device to the first mode; and
   carries out the setting of the first mode when the charging status indicates that a remaining battery level is less than a threshold level.

4. The information processing apparatus according to claim 1, further comprising a memory that stores information on whether to approve the setting on the operation mode of the first control device in the first mode,
   wherein the third control device sets the operation mode of the first control device to the first mode when information, which represents that the setting on the operation mode of the first control device in the first mode is approved, has been stored in the memory.

5. The information processing apparatus according to claim 1, wherein, when the power supply state changes to a certain condition while the operation mode of the first control device is set to the first mode, the third control device:
   retains the operation mode of the first control device in the first mode when the external device capable of delivering power has been connected to the information processing apparatus; and
   cancels the first mode when the external device capable of delivering power is disconnected from the information processing apparatus.

6. A power reception and delivery control circuit comprising:
   a control device that:
      acquires a power supply state of an information processing apparatus that includes a control circuit and a battery, wherein the control circuit controls, in accordance with an operation mode, power reception from an external device and power delivery to the external device, the external device being connected to the information processing apparatus;
      determine whether power is being delivered from an external power supply; and
      sets the operation mode of the control circuit to a first mode based on the acquired power supply state and on a result of the determination, wherein the first mode is an operation mode in which the power reception alone is enabled between the power reception from the external device and the power delivery to the external device.

7. A control method for power reception and delivery comprising:
   acquiring a power supply state of an information processing apparatus that includes a control circuit and a battery, wherein the control circuit controls, in accordance with an operation mode, power reception from an external device and power delivery to the external device, and the external device is connected to the information processing apparatus;
   determining whether power is being delivered from an external power supply; and
   setting the operation mode of the control circuit to a first mode based on the acquired power supply state and on a result of the determination, wherein the first mode is an operation mode in which the power reception alone is enabled between the power reception from the external device and the power delivery to the external device.

8. The control method according to claim 7, wherein the setting to the first mode is carried out when the power supply state of the information processing apparatus is a power-saving state or a power supply off state while power is not being delivered to the information processing apparatus from the external power supply.

9. The control method according to claim 7, further comprising determining, based on a charging status of the battery in addition to the power supply state and the result of the determination, whether to set the operation mode of the control circuit to the first mode,
   wherein the setting to the first mode is carried out when the charging status indicates that a remaining battery level is less than a threshold level.

10. The control method according to claim 7, further comprising storing, in a memory, information on whether to approve the setting of the operation mode of the control circuit in the first mode,
    wherein the setting to the first mode is carried out when information, which represents that the setting of the operation mode of the control circuit in the first mode is approved, has been stored in the memory.

11. The control method according to claim 7, further comprising, when the power supply state changes to a certain condition while the operation mode of the control circuit is set to the first mode,
    retaining the control circuit in the first mode when the external device capable of delivering power has been connected to the information processing apparatus, and
    canceling the first mode when the external device capable of delivering power is disconnected from the information processing apparatus.

* * * * *